United States Patent [19]

Willi et al.

[11] 4,363,824

[45] Dec. 14, 1982

[54] PROCESS FOR THE PRODUCTION OF A FOOD BASE INSTANTANEOUSLY DISPERSIBLE IN WATER

[75] Inventors: Albert Willi, Wallisellen; Willy Mauté; Oswaldo Mooser, both of Effretikon, all of Sweden

[73] Assignee: Societe D'Assistance Technique pour Produits Nestle S.A., Lausanne, Switzerland

[21] Appl. No.: 206,149

[22] Filed: Nov. 12, 1980

[30] Foreign Application Priority Data

Nov. 15, 1979 [CH] Switzerland ..................... 10196/79

[51] Int. Cl.³ ............................................. A23L 1/195
[52] U.S. Cl. ..................................... 426/589; 426/622
[58] Field of Search ............... 426/622, 625, 589, 601, 426/603, 606, 609, 524

[56] References Cited

U.S. PATENT DOCUMENTS 3,892,880  7/1975  Grolitsch ............................ 426/609
4,126,710 11/1978  Jaworski et al. ..................... 426/589

Primary Examiner—Raymond N. Jones
Assistant Examiner—Elizabeth A. Hatcher
Attorney, Agent, or Firm—Vogt & O'Donnell

[57] ABSTRACT

The invention provides a process for the production of a food base instantaneously dispersible in water which comprises mixing a flour material and fat, the fat, after admixture with the flour material, being subjected to a heat treatment to obtain appropriate crystal modifications in the fat, the heat treatment being carried out in the form of a controlled cooling of the molten fat so that the liquid fat content in the fat at approximately 25° to 35° C. is less than 50% according to nuclear magnetic resonance measurement, and the flour material and the fat are present in a ratio by weight of from 35:45 to 80:20. The crystal modifications in the fat prevent agglutination at room or storage temperatures. The food base is prepared in flake form and may be used in thickened instant products, particularly soups and sauces.

13 Claims, No Drawings

PROCESS FOR THE PRODUCTION OF A FOOD BASE INSTANTANEOUSLY DISPERSIBLE IN WATER

This invention relates to a process for the production of a food base instantaneously dispersible in water from a flour material and fat, in which the mixture of the flour material and the fat is subjected to a heat treatment to obtain appropriate crystal modifications in the fat.

The flours and starches used for binding packet soups or packet sauces cannot be dispersed by pouring on hot water, i.e. they form lumps. On the other hand, the roux most well known amoung housewives as a thickener for sauces or as a sauce base is a heated mixture of flour and fat. The positive role of the fat in this respect is quite clear. However, since the mixtures which have a high fat content are not really suitable for the preparation of powder-form products, instant food bases of the type in question are better supplied in tub or tube form. If nevertheless it is intended to produce them in flake form, the difficulty is that they have a pronounced tendency to agglutinate.

An object of the present invention is to provide, by a suitable heat treatment and by a suitable choice of the starting materials and the ratios by weight, a food base of flour material and fat which is and stays free-flowing, finely divided and non-agglutinating at room temperature, is instantaneously dispersible in water without forming any lumps and produces the required viscosity.

In the process according to the invention the flour material and the fat are mixed in a ratio by weight of from 55:45 to 80:20 and the heat treatment is carried out in the from of a controlled cooling of the molten fat after admixture with the flour material so that the liquid fat content of the fat at approximately 25° to 35° C. is less than 50% according to the nuclear magnetic resonance measurements.

It has been found that the required properties cannot be obtained by temperature cycles. Although it is normally assumed that it is only the temperature levels at which the fat is held and the holding times which are important in the heat treatment of fats, it has been found in the present case that controlled cooling is crucial.

In the context of the invention, the term "food base" is understood to apply to a product or semi-finished product which may be incorporated in soup or sauce mixes to act as a binder where soups or sauces are prepared by pouring boiling water onto these dry mixes.

In other words, this food base is required to develop a binding effect without forming lumps when boiling water is poured onto it and, while not in use, is required to be storable and not to agglutinate at room temperature. It has been found that the suitability and the appropriate organoleptic properties of this product may be judged on the basis of two criteria which are referred to hereinafter as the lump count and the binding effect or viscosity.

In order to investigate lump formation, the first step is to dissolve or disperse samples of the product in a standardised manner. This may be done by means of a so-called spoon machine. This machine consists of a standard laboratory stirrer of which the metal shaft carries an axially parallel standard coffee spoon at its lower end spaced two centimeters away. 150 ml of boiling water are poured onto 12 g of the product, followed by stirring for 15 s at 150 r.p.m. using the spoon machine. The suspension is then poured through a 1 mm mesh sieve. The sieve with the residue is dried for 1 hour at 130° C. and then weighed. The weight of the empty sieve is subtracted from the value obtained and the amount of lumps is expressed in percent of the total quantity of product. If the amount of lumps is smaller than about two percent, the product is judged to be good in regard to this feature.

The binding effect may be expressed in terms of Casson's plastic viscosity $\eta_c$ (in mPa.s.). If the viscosity is in the range from 20 mPa.s to 35 mPa.s, the product is judged to be organoleptically good in the sense that it produces a pleasant "mouthfeel". To determine this viscosity, the product may be dispersed in the same way as described above. The sieved suspension may then be investigated for its flow behaviour in a rotary viscometer (Contraves Rheomat 15-T-FC, bath temperature 70° C., Insert B).

Thus, on the basis of these two criteria and with regard to the free flow non-agglutination and storability or stability of the product, it has been established that the flour material and the fat have to be used in a ratio by weight of from 55:45 to 80:20 and that the heat treatment has to be carried out in the form of controlled cooling so that the liquid fat content of the fat at 25° to 35° C. is less than 50%. If more fat is present in the mixture of flour material and fat, the viscosity of the suspension prepared as described above (hereinafter referred to simply as the suspension) becomes too low. If less fat is used, not only does the lump count automatically increase beyond 2%, but difficulties are encountered in preparing a homogeneous mixture of flour material and fat. The fat content of the mixture and its liquid fat fraction at 25° to 35° C. may be measured very quickly and easily as follows using an NMR pulse spectrometer (NMR being the acronym for nuclear magnetic resonance).

The measurements are based on the fact that protons in a magnetic field are stimulated by a high-frequency pulse. The decline of the stimulated state is followed by the spectrometer and reproduced as a curve which is characteristic of the so-called relaxation time.

Now, the relaxation time of protons in liquid fat is different from that of protons in solid fat. This difference is used by the apparatus for determining the fat and liquid fat fractions. The measurements may be made for example with a "Minispec p 20" manufactured by the Bruker Company of Karlsruhe, Federal Republic of Germany (setting of the spectrometer, pulse program: 90°, repetition rate: 25). The spectrometer may be calibrated with a sample of product in which the fat content has been conventionally determined by extraction. In this way, a factor is obtained to which the calculating unit of the spectrometer is set and which is product-specific. To carry out the measurement, the samples of product are introduced into a suitable test tube (sample level: minimum 3 cm), tempered, the tube dried, introduced into the spectrometer and measured. For measuring total fat, the temperature of the tempering bath may amount to 70° C. The sample may be left therein for 15 minutes. In this way, the fat in the sample is melted and the total fat content is equal to the liquid content thereof. The measurement must of course be carried out immediately after tempering.

To measure the liquid fat fraction at 25° to 35° C., the sample may be held at 25° to 35° C. for 20 minutes and then immediately measured (after drying of the tube) in the spectrometer. The result of this direct measurement is the percentage of liquid fat in the sample at 25° to 35°

C. However, since it is the percentage of liquid fat, based on the total fat, which is interesting, the value obtained still has to be divided by the total fat content (in % of the sample). The water present in the sample is co-measured and falsifies the result of the measurement. With the aid of correction curves which may readily be established by the expert, it is possible to take this error source into consideration.

Fats having a clear melting point of 35°–50° C. have proved to be suitable for carrying out the process according to the invention. In the case of fats having a lower clear melting point, the liquid fat content at 25° to 35° C. cannot be sufficiently reduced. With fats having a higher clear melting point, the suspension is attended by an organoleptic disadvantage, namely a slightly sandy sensation which is possibly attributable to the formation of crystals on the palate.

A crucial aspect in the choice of the type of fat is the requirement whereby the liquid fat content of the product at 25° to 35° C. must be low enough to ensure that the product does not agglutinate on storage at a maximum temperature suitable for a certain climatic zone. In this respect, preferred fats are peanut fats and palm fats having clear melting points in the above-mentioned range. For temperate zones, 30° C. may be regarded as a suitable maximum temperature, whereas for colder zones lower temperatures of up to about 25° C. and for warmer zones, higher temperatures of up to about 35° C. may be regarded as suitable.

Not only has it been found that, in the present case, temperature cycles are unsuccessful, it has also been found that the successful controlled cooling operation for various fats may be carried out at a certain constant cooling rate which directly leads to the required result. This optimal cooling rate appears to be inversely proportional to the clear melting point and is in the range from approximately 1° to 8° C./minute. However, for higher cooling rates, which may also be applied in the process according to the invention and are even more advisable on practical grounds, the product has to be stabilized by holding it at a temperature in the range of from 2.5° to 20° C. for a period which may amount to between 5 minutes and 6 days, where the higher the cooling rate is, the longer the corresponding storage period must be. The possible cooling rates are between 1° and 800° C./minute. Preferably, descending it is above all the temperature range between 35° C. as the upper limit and 5°–10° C. as the lower limit which is passed without interruption at this constant cooling rate. This is because, above 35° C., controlled cooling may be interrupted without the required liquid fat content being impossible to obtain. However, this is not necessarily the case in the said range. Below 5° to 10° C., any interruption is more like a stabilisation phase which, although not absolutely necessary, is nevertheless harmless.

Various flours, usually together with a certain amount of various starches, may be used as the flour material. It is possible to use wheat flour, rice flour or even yellow pea flour, depending on the end product envisaged, such as soups or sauces of various kinds and flavors. Wheat flour having a degree of extraction of 65% or 80% either on its own or in combination with an addition of starches, such as corn starch, potato starch, wheat starch or rice starch, is particularly suitable. Guar gum, pectin or even a mixture of tapioca starch and gelatin may also be added to the wheat flour as long as the product obtained gives suspensions of the required viscosity with an acceptably low tendency towards lump formation. Where flours which develop a relatively weak binding effect are used, such as rice flour or yellow pea flour for example, it is advisable to add a starch that is normally unsuitable such as tapioca starch. Accordingly, this is permissible where either the flour has inadequate binding power or a third additive such as gelatin for example, reduces the viscosity.

Finally, a few percent of a solid fat as seed former and suitable quantities of a taste stabiliser, such as natural oxidation inhibitors for example, may be added to the abovementioned fat and flour material.

In the practical application of the process according to the invention, the flour material, optionally a separately prepared premix of flour and starch, may be added to the molten fat. The temperature of the molten fat may be approximately 60° to 70° C. By contrast, the final temperature of the flour-fat mix may be between about 38° and 70° C., depending on whether or not the mix itself is heated. This depends on the way in which the flour-fat mix is cooled and the flakes are formed. Preferably, the mix is applied either to a cooling roller or to a steel cooling belt, cooled thereon in a few seconds to the final temperature of 5° to 10° C. and then scraped off. The residence time on a cooling roller may be as short as 3 to 5 s so that subsequent prolonged, stabilisation-promoting storage for a few days at a temperature in the range from 2.5° to 20° C. is recommended. The possible longer residence time of for example 6 to 20 s on a steel cooling belt is preferably followed by storage for about 2 days in a cold room, for example at 2° to 10° C.

The product obtained by the process according to the invention may be used in thickened instant products, particularly soups and sauces.

The invention is illustrated by the following Examples in which the percentages quoted represent percentages by weight.

EXAMPLE 1

47% of wheat flour (degree of extraction 65%) and 17% of corn starch are premixed. 35% of peanut fat having a clear melting point of 41°–43° C. are melted on a hotplate and stored in a container at 60° C. The molten fat is placed in a heat stirrer-equipped double-walled vessel, after which first 0.02% of a mixture of natural oxidation inhibitors and then 1% of a triglyceride melting at 57°–59° C. are added with stirring. The flour-starch mix is then slowly added. The final temperature of the melt is adjusted to 60°–65° C. The melt, accommodated in an insulated container is then moved into the vicinity of a cooling tank and, by means of a gear pump, is pumped from below through a bottom inlet into a double-walled conical distribution storage tank. The melt is applied from below from the storage tank to a cooling roller (Escher Wyss, type EK 395) by means of an application roller. The cooled and solidified product is scraped off with a knife.

In the connected cooling unit, the system extracts 24,000 kcal/h for an effective cooling area of 2.8 m² from the application roller to the scraping knife.

The following conditions were adjusted at the cooling roller:

| | |
|---|---|
| product throughput | 500–700 kg/h |
| gap between cooling and application rollers | 200–230μ |
| rotational speed of application roller | 15.5 r.p.m. |

| | |
|---|---|
| rotational speed of cooling roller | 7.5 r.p.m. |
| residence time of the product on the cooling roller | 3.5 s |
| melt application temperature | 60–65° C. |
| brine temperature | (−8°)–(−4° C.) |
| brine throughflow | 10–15 m³/h |
| flake ejection temperature | 8–12° C. |

The flakes accumulating have a surface area of the order of 9 to 25 mm² and a thickness of from 0.2 to 0.3 mm. They are immediately packed in large (400 kg) bags and stored in a cold room for at least two days at 8° to 10° C. After this storage period, the flakes no longer stick together. They are ready for processing in dry soup or sauce mixes. The flakes have the same quality features even after storage for 3 months at 30° C.

EXAMPLE 2

Flour-fat flakes are produced in the same way as in Example 1 from 36.5% of palm fat having a clear melting point of 41°–43° C., 47% of wheat flour (degree of extraction 65%) and 16.5% of potato starch. Whereas boiling water has to be poured onto the instantly dispersible flour-fat flakes according to Example 1, the flakes according to this Example 2 can also be reconstituted with water heated to 80° C.

EXAMPLE 3

47% of wheat flour (degree of extraction 65%) and 17% of potato starch are separately premixed and metered. 37% of palm fat having a clear melting point of 41°–43° C. is melted at 60° to 65° C. and continuously mixed with the flour-starch premix in a twin-screw mixer. On leaving the mixer, the melt is applied to a steel belt by means of a feed through. The double-walled feed trough is heated with water at 50° to 60° C. The working conditions on the steel belt are adjusted as follows:

| | | |
|---|---|---|
| Feed temperature of the melt (of fat at 60–65° C. and flour/starch at room temperature) | | 38–42° C. |
| flake ejection temperature | | 7–10° C. |
| residence time | | 12 s |
| film thickness | | 0.2–0.3 mm |
| surface coverage (for a film thickness of 0.3 mm) | | 0.360 kg/m² |
| throughtput (for cooling surface of 5 m²) | | 540 kg/h |
| brine temperature | entry | 0–3° C. |
| | exit | 2.5–5° C. |
| brine throughput | | 25 l/kg of product |

According to NMR, the flakes have a liquid fat content at 30° C. of 46% on ejection and of 42% after 2 days in a cold room at 8° C.

EXAMPLE 4

Various flour-fat flakes of various compositions are prepared. The flour material on the one hand and the molten fat on the other hand are separately prepared before they are mixed together. The heated mixture is kept at 70° C. for 45 minutes and then cooled in a suitable calorimeter under controlled conditions, and at a constant cooling rate to a temperature of 5° C. The solid product is carefully collected in flake form, stored at room temperature and examined for the lump count ("lumps" in short), its binding effect or its plastic viscosity $\eta_c$ according to Casson ("viscosity" in short) and, optionally, for its liquid fat content at 30° C. according to NMR or its optimal cooling rate in the manner described earlier on. The nature of the tests and the results obtained are set out in the following Tables. The terms "wheat flour" and "palm fat" used in the Tables always apply respectively to wheat flour having a degree of extraction of 65% and palm fat having a clear melting point of 41°–43° C.

TABLE 1

Wheat flour and corn starch in a ratio of 3:1 and various palm fat contents. No. 1 forms too many lumps. No. 4 has too low a viscosity.

| No. | Fat content % | Lumps % | Viscosity mPas |
|---|---|---|---|
| 1 | 30 | 7.6 | 27.4 |
| 2 | 36.5 | 0.9 | 30.4 |
| 3 | 40 | 0.5 | 22.8 |
| 4 | 50 | 0.2 | 11.8 |

TABLE 2

Peanut fat with a clear melting point of 48–50° C., corn starch and wheat flour in various ratios. No. 5 has too high viscosity on account of the unusually high starch content. No. 6 forms too many lumps.

| | Composition in % | | | | |
|---|---|---|---|---|---|
| No | Fat | Corn starch | Wheat flour | Lumps % | Viscosity mPa.s. |
| 1 | 40 | 15.5 | 45 | 1.1 | 19 |
| 2 | 38 | 15.5 | 46.5 | 0 | 21.3 |
| 3 | 36.5 | 10.0 | 53.5 | 0.8 | 16.7 |
| 4 | 36.5 | 15.9 | 47.6 | 0.2 | 25.1 |
| 5 | 36.5 | 47.6 | 15.9 | 1.5 | 45.6 |
| 6 | 30 | 17.5 | 52.5 | 3.3 | 25.1 |

TABLE 3

36.5% of fats of various types, 15.9% of corn starch, 47.6% of wheat flour. No. 4 cannot be used because soya fat is too liquid at 30° C. (see Table 3b).

| No. | Fat Type | Clear M.p. °C. | Lumps % | Viscosity mPa.s |
|---|---|---|---|---|
| 1 | peanut fat | 48–50 | 0.2 | 25.1 |
| 2 | peanut fat | 41–43 | 2.9 | 30.5 |
| 3 | palm fat | 41–43 | 1.0 | 30.4 |
| 4 | soya fat | 36–38 | 1.2 | 20.3 |

TABLE 3b 36.5% of fats of various types, 15.9% of corn starch, 47.6% of wheat flour. In addition to the optimal cooling rate and the liquid fraction at 30° C., stabilisation in the event of rapid cooling is also illustrated. The suitable temperature range was determined by the stabilisation for 1 hour after cooling at a rate of 50° C./minute. No. 4 cannot be used because soya fat is too low-melting.

| No. | Fat Type | Clear M.p °C. | Liquid fat fraction 30° C., % | Optimal cooling rate °C./min | Stabilisation range °C. |
|---|---|---|---|---|---|
| 1 | peanut fat | 48–50 | 14.4 | 1.5 | 5–20 |
| 2 | peanut fat | 41–43 | 26.0 | 2 | 2.5–17 |
| 3 | palm fat | 41–43 | 33.0 | 3 | 5–15 |
| 4 | soya fat | 36–38 | 59.0 | 12 | (−10)–15 |

TABLE 4

Various types of flour. Oatmeal, Nos. 2 and 3, on its own, i.e. without starch, gives a suitable product but with a slightly slimy taste.

| No. | Flour type | Composition Corn starch | Palm fat | Lumps % | Viscosity mPa.s |
|---|---|---|---|---|---|
| 1 | 47.6% of wheat flour, degree of extraction 80% | 15.9 | 36.5 | 1.8 | 25.1 |
| 2 | 65% of oatmeal | — | 35 | — | 21.3 |
| 3 | 70% of oatmeal | — | 30 | 0.5 | 26.6 |

TABLE 5

15.9% of various starches, 36.5% of palm fat, 47.6% of wheat flour

| No. | Starch type | Lumps % | Viscosity mPa.s |
|---|---|---|---|
| 1 | corn starch | 1 | 30.4 |
| 2 | potato starch | 1.8 | 36.5 |
| 3 | wheat starch | 2.8 | 26.2 |
| 4 | rice starch | 2.5 | 28.2 |

TABLE 6

Rice flour and yellow pea flour with tapioca starch and palm fat in various ratios.

| No. | Palm fat | Tapioca starch | Rice flour | Lumps % | Viscosity mPa.s |
|---|---|---|---|---|---|
| 1 | 25 | 5 | 70 | 2 | 23.6 |
| 2 | 36.5 | 12.7 | 50.8 yellow pea flour | 2.4 | 20.5 |
| 3 | 30 | 20.5 | 49.5 | 0.8 | 28.9 |
| 4 | 36.5 | 20.4 | 43 | 0.5 | 25.1 |
| 5 | 36.5 | 21.2 | 42.3 | 2 | 32 |

TABLE 7

Palm fat and wheat flour with other thickeners. No. 2 only is useable and only gives the viscosity indicated when 150 ml. of boiling water are poured onto only 5 g as against 12 g.

| No. | Palm fat | Wheat flour | Thickener | Lumps % | Viscosity mPa.s |
|---|---|---|---|---|---|
| 1 | 36.5 | 47.6 | 15.9% of pectin | 1 | 20.6 |
| 2 | 45 | 42.5 | 12.5% of guar gum | 0 | (30.4) |

TABLE 8

50% of wheat flour, 30% of palm fat, gelatin and tapioca starch in various ratios.

| No. | Gelatin % | Tapioca starch % | Lumps % | Viscosity mPa.s |
|---|---|---|---|---|
| 1 | 15 | 5 | 0.4 | 25.9 |
| 2 | 10 | 10 | 0.8 | 38.5 |

We claim:

1. A process for the production of a food base instantaneously dispersible in water which comprises:
   (a) mixing a flour material and a hot molten fat in a ratio of from 55:45 to 80:20 by weight;
   (b) subjecting the mixture to controlled cooling in order to obtain crystal modification in the fat so that the liquid fat content in the fat at approximately 25° to 35° C. is less than 50%; whereby the food based obtained, after dispersion in water has a lump count of less than 2% by weight based on the total weight of the food base and a viscosity in the range of from 20 mPa to 35 mPa, based on 12 grams of the food base dispersed in 150 ml of water.

2. A process as claimed in claim 1, wherein the fat has a clear melting point of 35°–50° C.

3. A process as claimed in claim 1, wherein the cooling rate amounts to from 1° to 800° C./minute.

4. A process as claimed in claim 1, further comprising the step of stabilizing the cooled mixture by storing it at a temperature of 2.5° to 20° C. for 5 minutes to 6 days after the controlled cooling step.

5. A process as claimed in claim 1, wherein the flour material consists of wheat flour with added corn, potato, wheat or rice starch.

6. A process as claimed in claim 1, wherein the flour material consists of wheat flour with added guar gum or pectin.

7. A process as claimed in claim 1, wherein the flour material consists of wheat flour with added gelatin and tapioca starch.

8. A process as claimed in claim 1, wherein the flour material consists of rice flour or yellow pea flour and tapioca starch.

9. A process as claimed in claim 1, wherein the molten fat is cooled within the temperature range of between 35° C. as the upper limit and 5° C. to 10° C. as the lower limit without interruption and at a constant cooling rate.

10. A food base when prepared by a process as claimed in claim 1.

11. A process for the production of a food base instantaneously dispersible in water which comprises:
   (a) mixing a flour material and a hot molten fat in a ratio of from 55:45 to 80:20 by weight;
   (b) cooling the mixture at a controlled cooling rate of from 1° to 800° C./minute in order to obtain crystal modification in the fat so that the liquid fat content in the fat at approximately 25°–35° C. is less than 50%;
   whereby the food base obtained, after dispersion in water, has a lump content of less than 2% by weight based on the total weight of the food base and a viscosity in the range of from 20 mPa to 35 mPa, based on 12 grams of the food base dispersed in 150 ml of water.

12. A process for the production of a food base instantaneously dispersible in water which comprises:
   (a) mixing a flour material and a hot molten fat in a ratio of from 55:45 to 80:20 by weight;
   (b) cooling the mixture at a controlled cooling rate of from 1° to 800° C./minute in order to obtain crystal modification in the fat so that the liquid fat content in the fat at approximately 25°–35° C. is less than 50%;
   (c) stabilizing the cooled mixture by storing the same at a temperature of from 2.5° to 20° C. for 5 minutes to 6 days;
   whereby the food base obtained, after dispersion in water, has a lump count of less than 2% by weight based on the total weight of the food base and a viscosity in the range of from 20 mPa to 35 mPa, based on 12 grams of the food base dispersed in 150 ml of water.

13. A process for the production of a food base instantaneously dispersible in water which comprises:

(a) mixing a flour material and a hot molten fat having a clear melting point of from 35° to 50° C. in a ratio of from 55:45 to 80:20 by weight, wherein said mixture has a temperature of between about 38° and 70° C.;

(b) cooling the mixture to a temperature of from 5° to 10° C. at a controlled cooling rate of from 1° to 800° C./minute in order to obtain crystal modification in the fat so that the liquid fat content in the fat at approximately 25°–35° is less than 50%;

(c) stabilizing the cooled mixture by storing the same at a temperature of from 2.5° to 20° C. for 5 minutes to 6 days;

whereby the food base obtained, after dispersion in water, has a lump count of less than 2% by weight based on the total weight of the food base and a viscosity in the range of from 20 mPa to 35 mPa, based on 12 grams of the food base dispersed in 150 ml of water.

* * * * *

UNITED STATES PATENT AND TRADEMARK OFFICE
CERTIFICATE OF CORRECTION

PATENT NO. : 4,363,824
DATED : December 14, 1982
INVENTOR(S) : ALBERT WILLI, WILLY MAUTE and OSWALDO MOOSER It is certified that error appears in the above—identified patent and that said Letters Patent is hereby corrected as shown below:

Title Page, under the subheading "Inventors:", "Sweden" should read --Switzerland--.

Line 11 of the ABSTRACT, "35:45" should read --55:45--.

Column 1, line 34, "from" should read --form--.

Column 3, line 46, remove the word "descending" and insert it at line 47 prior to the word "temperature".

Column 4, line 11, "abovementioned" should read --above-mentioned--.

Column 5, line 35, "through" should read --trough--.

Column 10, line 2, "35°" should read --35°C--.

*Signed and Sealed this*

*Eighth* Day of *March 1983*

[SEAL]

*Attest:*

GERALD J. MOSSINGHOFF

*Attesting Officer*     *Commissioner of Patents and Trademarks*